United States Patent [19]

Perrigo

[11] Patent Number: 4,956,632
[45] Date of Patent: Sep. 11, 1990

[54] MULTIPLE PURPOSE ELECTROMECHANICAL VEHICLE SIGNAL DEVICE

[76] Inventor: John M. Perrigo, 5431 Crestview Dr., Chattanooga, Tenn. 37343

[21] Appl. No.: 349,486

[22] Filed: May 9, 1989

[51] Int. Cl.⁵ .............................. B60Q 1/22; B60Q 1/44
[52] U.S. Cl. ..................................... 340/463; 340/472; 340/479; 340/481; 340/487
[58] Field of Search ............... 340/479, 463, 436, 473, 340/481, 482, 487, 467, 815.19, 815.24, 815.25, 464, 472, 485; 362/80.1, 66, 272

[56] References Cited

U.S. PATENT DOCUMENTS

| | | | |
|---|---|---|---|
| 1,751,018 | 3/1930 | Signor | 340/481 |
| 1,792,250 | 2/1931 | Signor | 340/481 |
| 2,236,879 | 4/1941 | Morris | 340/481 |
| 2,946,042 | 7/1960 | Beasley | 340/479 |
| 2,960,680 | 11/1960 | Lea | 340/463 |
| 3,538,496 | 11/1970 | Bumpous | 340/467 |
| 3,882,449 | 5/1975 | Bouchard et al. | 340/436 |
| 4,013,996 | 3/1977 | Hubbard | 340/463 |
| 4,700,277 | 10/1987 | Moore | 340/479 X |

Primary Examiner—Joseph A. Orsino
Assistant Examiner—Brian R. Tumm

[57] ABSTRACT

A moving signal light for both stationary or traveling vehicles and equipment. The unit can be mounted selectively either inside or outside the vehicle and is controlled either automatically in response to a collision or by the drivers action to provide a flashing moving conspicuous warning light to both traffic and to pedestrians. The unit is activated in one of four ways; thru the brake switch, thru a reverse or back up switch, by a manual switch, or by the automatic collision switch. The movement of the variable speed variable intensity light is controlled by a motion detector in combination with a relay or by the manual switch which has two operating modes.

3 Claims, 3 Drawing Sheets

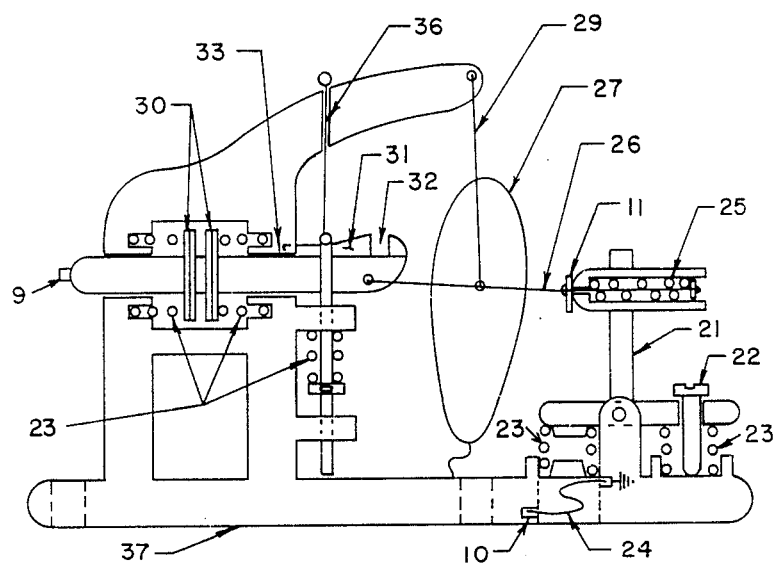
FIG. 4
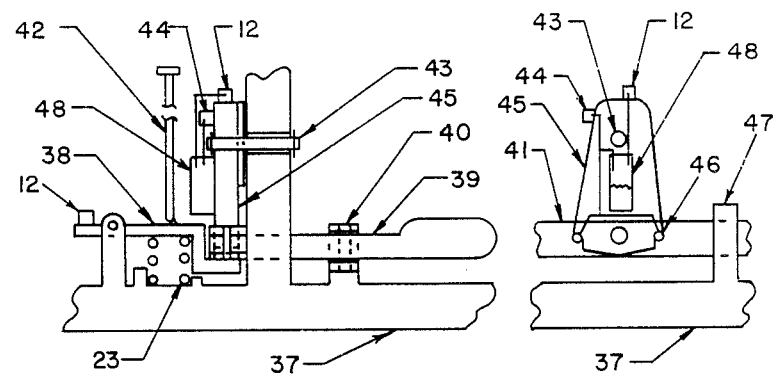
FIG. 5
FIG. 6

MULTIPLE PURPOSE ELECTROMECHANICAL VEHICLE SIGNAL DEVICE

BACKGROUND OF THE INVENTION

At present, stop lights are incorporated in three or more tail lights that give a constant illumination and lack any motion to attract the attention of following drivers. When brakes are applied, either another set of lights are energized or another filament in the tail light is energized to give brighter illumination. The increase in illumination is the only signal that a driver is slowing or that the vehicle is stopping. The following driver is not certain if a fast or emergency stop is taking place and his reaction may not be responsive enough to avoid a collision. This lack of response is caused by the indefinite signal from a one intensity stop light system and multiple collisions often occur on high speed freeways where drivers do not maintain a safe braking distance between vehicles.

At present, none of the back-up alarm systems on either vehicles or equipment, display an active warning light. Heavy equipment is required by law to give an audible signal which may or may not be heard by a person in a closed vehicle. The back-up lights on most vehicles cannot be seen by pedestrians standing at the side of the vehicle and they may have no warning the vehicle may back up. There is a large class of vehicles and equipment that operate along highways and streets that stop and start frequently but give no signal to approaching vehicles. Whether moving or stationary they are often a hazard that is easy to overlook due to lack of a warning signal. The non-lighted fluorescent triangle gives very poor warning of the hazard.

At present, vehicles are not equipped with an automatic collision or roll-over signal light. If a driver passes out and the vehicle leaves the road or crashes or rolls over, the driver may be trapped and die before someone notices the vehicle. The vehicle may be parked unattended and be struck by another vehicle which subsequently drives off if the collision is unseen. A vehicle can be involved in a collision where the driver is unable to operate either the brakes or the emergency warning lights, and due to lack of warning, other vehicles could be involved in an additional collision.

At present, none of the emergency warning light systems incorporate a moving flashing light.

| DESCRIPTION OF PRIOR ART | | | |
|---|---|---|---|
| 2,873,437 | 02/10/59 | Gruner & Ebbage | 340/70 |
| 2,960,680 | 11/15/60 | Lea | 340/70 |
| 3,037,188 | 05/29/62 | Weigl | 340/91 |
| 3,487,358 | 12/30/69 | Ubukata, Mizutand & Iyoda | 340/81 |
| 3,800,430 | 04/02/74 | Samra | 340/95R |
| 3,818,438 | 06/18/74 | Stacha | 340/70 |
| 3,818,439 | 06/18/74 | Maine | 340/81R |
| 3,832,968 | 09/03/74 | Martin | 116/28R |
| 4,250,486 | 02/10/81 | Kiefer, Lysenko & Cade | 340/52R |

The patent with the most similar function appears to be U.S. Pat. No. 2,960,680 a Safety-Stop & Distress Signaling System issued to Mr. Lea on Nov. 15, 1960. As described, the unit uses an electrical motor driven disc to make and break the light beam from the safety stop light. The light itself is stationary and the illusion of motion would be no more eye catching than a flasher unit in series with the light which would be much less expensive to manufacture. U.S. Pat. No. 4,250,486 is a Vehicle Motion Alarm issued to Mr. Kiefer, Mr. Lysenko and Mr. Cade in Feb. 1981. As described, the motion switch acts only when the vehicle is moving with the vehicle engine stopped, or when the vehicle transmission is in neutral. The unit has a completely different function and the construction is also very different.

Patents have also been searched for a manually controlled emergency signal light similar to this invention and none were found.

SUMMARY OF THE INVENTION

This invention uses the electrical signal from the brake lights of a vehicle whether or not the vehicle is stopped, slowing down, or braking for an emergency stop. If there is no change in the vehicles speed when the brake lights come on, the motion of the signal light is slow and only the dim filament in the moving light is lit. If the vehicle is in motion and the brakes are applied for a quick or emergency stop, the motion detector senses the deceleration and an electrical signal to a relay changes the speed of the drive unit to a high speed and also energizes the bright flashing light while maintaining the dim light. This results in a highly visible signal that can be seen for a much greater distance under all kinds of weather and driving conditions. This amplified signal will indicate the drivers intentions and allow the following drivers to take much more responsive action to prevent a collision.

With this invention, the back-up warning light also becomes a much improved indicator of the drivers intention and the vehicles movement. When the vehicle is shifted into reverse, the slow speed of the drive unit is energized along with the dim filament of the light bulb, resulting in a slow moving dim light. Current from the back-up switch also activates the motion detector so that when the vehicle starts to move, a signal is sent to the relay which in turn allows current to activate the high speed bright flashing light. The highly visible signal will warn both pedestrians and other drivers that the vehicle is in motion. If mounted on heavy equipment or equipment along the highway, the unit would be a great improvement over the nonelectrical and nonmoving symbol now in use.

As a collision and roll-over warning light, this unit is designed to function automatically without any action on the part of the driver, even when the vehicle is unattended. The vehicle battery is connected directly to the relay and to the collision and roll-over detector. If a collision or roll over occurs, the detector closes a set of contacts which energizes a relay which in turn sends a current to the high speed contact of the drive unit and also energizes a flasher connected to the bright filament and to the dim filament. This highly visible signal will alert other drivers or anyone passing that a collision or roll over has occurred.

The contacts on the detector are designed to stay closed and the unit will remain operating as long as the battery furnishes current or until the unit is shut off with one of the reset buttons.

With this invention, a vehicles emergency warning light will be much more functional and give other vehicles a warning for a greater distance. The vehicle battery is connected directly to a manual switch and to the relay. If the switch is set on low, the relay energizes the slow speed contact on the drive unit along with the dim filament. If the switch is set on high, the relay energizes the high speed contacts on the drive unit along with the flasher contacts. The fast moving bright flashing light will give a highly visible signal for much greater distance than existing emergency signals. If the unit is roof mounted on vehicles such as mail carriers, the unit has a removable reflector that would allow the signal to be seen for 360 degrees instead of from just the back and sides. A conventional wrap around lens is also provided with the case of the signal device unit.

BRIEF DESCRIPTION OF THE DRAWINGS

FIG. 2 shows the signal unit in the location required on new vehicles after 9/85.

FIG. 4 is a section view of the motion detector and the front and rear collision detectors.

FIG. 5 is a side view of the collision detector.

FIG. 6 is a front view of the side collision and the roll-over detectors.

DESCRIPTION OF THE PREFERRED EMBODIMENT

Figure 1:
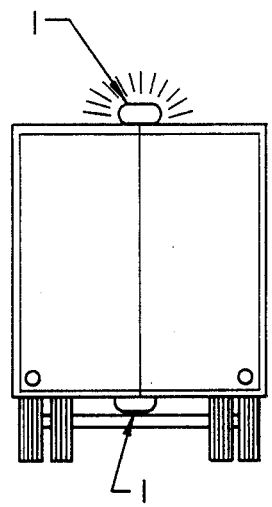
FIGS. 1 and 2 are perspective views of the signal device located in various positions on vehicles.
Figure 2:
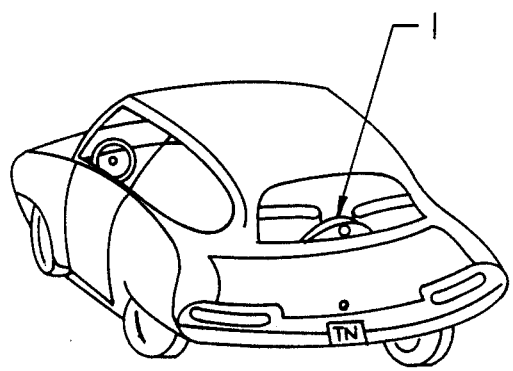
Figure 3:
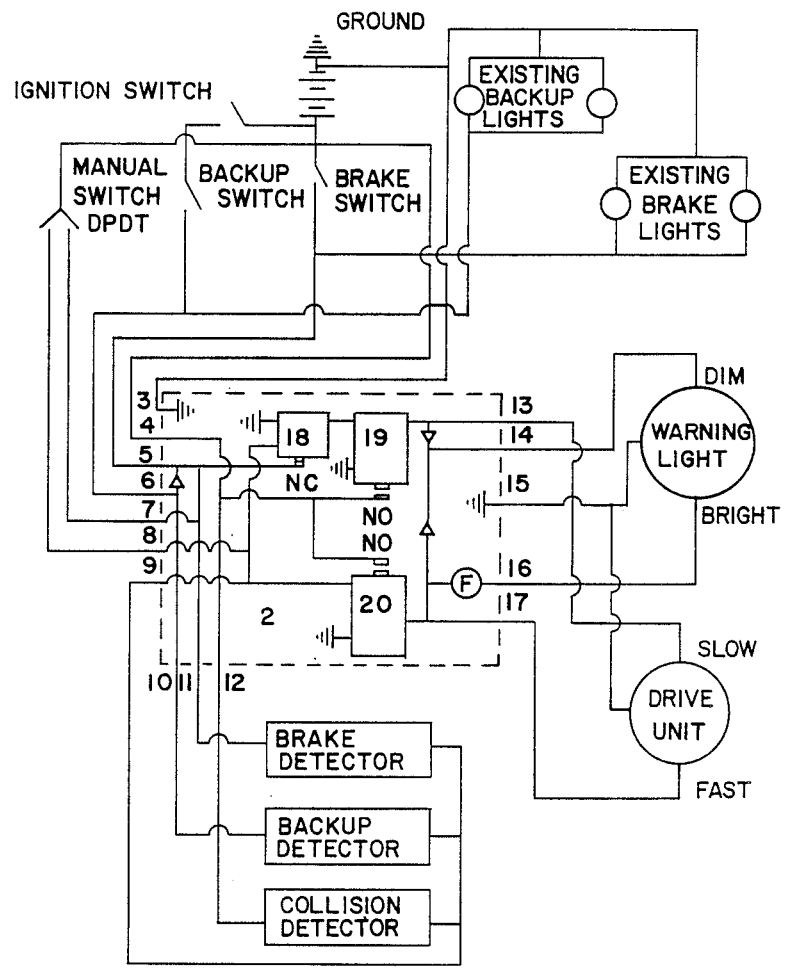
FIG. 3 is a schematic diagram of the electronic circuit showing the printed circuit board with the relay, the flasher, diodes and incoming and outgoing contacts.

For the purposes of assisting in the understanding of the principles of the invention, reference is made to the embodiments, illustrated in the drawings, and specific language will be used to describe the functions of the parts. It is specified that no limitation of the scope of the invention is intended, and alterations or further modifications in the illustrated device with additional applications of the principles of the invention as illustrated being contemplated. Referring to FIGS. 1 & 2, there is illustrated several types of vehicles as well as various locations where the multiple purpose signal device could be mounted. FIG. 2 shows the specific location of a safety light 1 required on vehicles manufactured after Sept., 1985. Referring to FIG. 3, the illustration shows a plan view of the electronic circuit mounted on a printed circuit board 2 with the electrical current from the vehicle battery feeding directly to connector 3 being the negative and connector 4 being the positive. Connector 4 also connects to the normally open relays 19 and 20 and also to connector 12 which connects to the collision and roll-over detector shown in FIG. 4. Connector 3 is the ground for the unit. Connector 5 is connected to the vehicle brake switch or stop light circuit and when the brakes are activated, the current from 5 activates relay 19 thru normally closed relay 18. The current from 19 energizes the low speed 13 and the low intensity light 14. Connector 5 also furnishes current to the motion detector unit thru contact 11. Connector 6 is connected to the vehicle back up or reverse switch, to contact 5 thru a diode and to contact 10 which is a motion detector contact. If the reverse switch is activated, the current thru 6 will activate relay 19 resulting in a slow moving low intensity light. Connector 7 is from a separate manual control switch which is also connected to contact 8 and to the vehicle battery for power. When the switch is turned to low, contact 7 will energize relay 19 with the resultant slow moving dim light. When the manual switch is set to high, current from contact 8 will energize relay 18 and also relay 20 resulting in a bright flashing light moving at a high speed, the dim light will also continue to operate. Connector 9 is the feed back contact from all the contacts in the motion, collision and roll-over detector. The result of contact 9 being energized will be to open relays 18 and 19 while sending current thru relay 20 resulting in the fast moving bright flashing light. FIGS. 4, 5, 6, and 7 show the preferred embodiment of the motion & collision detector unit which has a weighted contactor suspended by a cord that activates the contacts when the vehicle motion is detected, however, a pivoting contactor with either mercury switches or knife blade contacts is also contemplated. FIG. 4 is a sectional view showing some of the components in the motion and collision detector. Pivot arm 21 with contact 11 is adjustable with a threaded stud 22 which allows the compression springs 23 to control the position of the swinging contactor 27. The pivot arm also holds the moveable suppression spring 25. Contact 11 is connected to a flexible conductor wire 26 that passes thru the suppression spring and is attached to a disc that compresses the spring if tension is applied thru the conductor wire. The other end of the conductor wire is connected to the contactor 27. The solenoid 24 is energized thru 10 if the back up system is energized, this tilts the pivot arm forward and allows the contactor to swing free on the suspension cord 29. If the vehicle moves backward, the contactor will make contact with contact rod 28 which is a conductor with contact 9 on the end. The result of the back up motion will be to energize relay 20. Contact 11 is also energized by the brake or stop light circuit with a diode between 10 and 11 to prevent current in 11 from energizing the solenoid. If fast braking occurs, the contactor will swing forward and make contact with contact rod 28, thus feeding current thru contact 9 to energize relay 20. FIG. 4 also shows the components of the front and rear collision detectors. The position and response of the sliding contact rod 28 is adjustable with the compression springs 23 being set with the lock nuts 30. The top of contact rod 28 has an insulated bar 31 with two slots cut thru to the contact rod. The collision or impact connector 12 which feeds current directly from the battery 4 is attached to a vertical slide bar 34 with a horizontal rod at the top that rests on the insulated bar 31. Compression springs 23 put slight pressure on the insulated bar. If a front collision occurs, the weighted contactor 27 drives the contact rod 28 forward and the rod on the top of the slide bar drops into slot 32 making an electrical contact with 28 and energizing contact 9.

If a rear end collision occurs, the weighted contactor 27 acts as a stationary mass and puts tension on contact rod 28 thru the nonconducting flexible connector 35. The tension on 35 causes the contact rod 28 to slide backward and the rod on the top of slide bar 34 drops into slot 33 making the same electrical connection to contact 9. Slide bar 34 can be reset by pulling up on connector 36 which extends thru the top of the cover. 37 is a molded mounting base and frame for the detector. For clarity the side collision and roll-over detectors are shown in FIGS. 5, 6, and 7, even though they are an integral part of the detector unit shown in FIG. 4.

FIG. 5 is a sectional view of the side collision detector showing connector 12 from the battery 4 on the spring loaded 23 pivoting connector rod 38. If a side collision occurs, the weighted contactor 27 strikes one of the pivot arms 39 mounted on each side. The arm pivots about 40 and moves the spring loaded linkage 41 that rotates contact bar 45 about pivot pin 43. 42 is a reset to shut off the unit.

FIG. 6 is a front view of the side collision and roll-over detector which shows the linkage 41 that slides thru posts 47 mounted on the base. The compression springs 23 are adjustable with lock nuts 30 (shown in FIG. 7) to control the amount of force required to move the contact bar 45 around the pivot 43. If the bar 45 moves a prescribed distance either to the right or left, connector rod 38 will pivot up into one of the locking slots 46 on the base of the contact bar and make contact completing the circuit and energizing contact 9 thru connector 44. This automatic collision detector will energize relay 20 if the vehicle is struck broadside with sufficient force to activate the unit. 48 is a shock proof mercury switch mounted on the contact bar 45. This is the roll-over detector. Contact 12 connects to this mercury switch which will energize contact 44 and then contact 9 if a roll over occurs.

Figure 7:
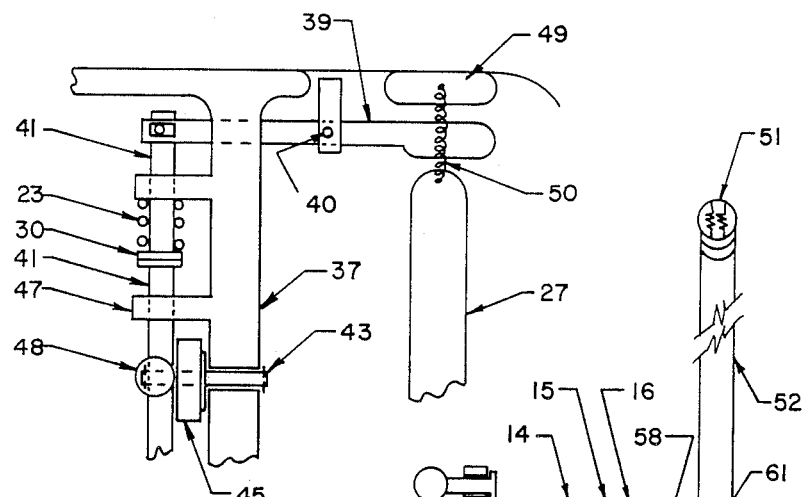
FIG. 7 is a plan view showing one of the side collision detectors.

FIG. 7 is a plan view of one of the side collision detectors. The second detector is a mirror image of the unit shown. The sway suppression tension springs 50 are connected to the contactor 27 and to a side post 49 with a cord thru the middle of the spring to limit the travel of the contactor to no more than that required to activate the unit if a side collision occurs.

Figures 8, 9:
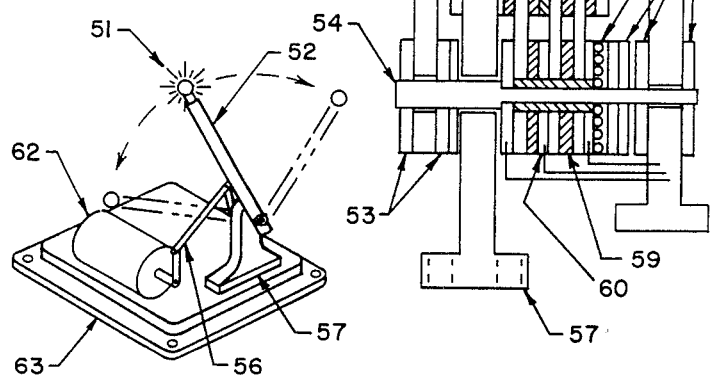
FIG. 8 is a section view of the pivot showing the double filament bulb, the light rod and the sliding contacts.
FIG. 9 is a perspective of the unit without the cover, showing the light in several operating positions.

FIG. 8 is a side sectional view of the motion unit showing the double filament bulb 51 mounted on top of the light rod 52 which is fastened to the rotating pivot shaft 54 with lock nuts 53. The pivot shaft is moved when the torque arm 55 responds to the motion of the drive unit thru the linkage at 56. The stationary contacts for the ground 15, the dim filament 14, and the bright filament 16, are fastened to the pivot post 57 on a locking lug 58. The slip ring connectors which feed current to the bulb, move with the light rod 52 on the pivot shaft. Insulated washers 59 separate the slip rings 60 with a compression spring 61 and lock nuts 53 maintaining a constant contact during motion of the pivot shaft. The pivot post 57 has mounting slots in the base for adjusting its position with relation to the drive unit. When current is fed to contact 16 the bright filament is lit. The preferred embodiment for the motion of the light rod is a pivoting motion in a near vertical plane, however both a horizontal and a vertical motion of the light rod is also contemplated.

FIG. 9 is a perspective view of the multiple purpose vehicle signal device 1 showing one of the possible motions of the unit in operation. The drive unit 62 is shown connected to the torque arm 55 thru linkage 56. If the drive unit is activated, the torque arm moves and the light rod 52 with the double filament bulb 51 moves at either a slow speed 13 with a dim light 14 or at a high speed 17 with a bright flashing light 16 and a dim light. FIG. 9 shows the unit in operation with the light 51 and rod 52 in several positions.

What is claimed is:

1. A vehicle with an improved rear-mounted signal device consisting of a brake light including a double filament light bulb attached to a moving rod;
    a variable speed drive unit connected to the moving rod for moving the brake light at various speeds;
    a motion detector unit to detect a change in speed of the vehicle in response to rapid braking;
    an electronic circuit with a relay, which is responsive to the vehicle brake light circuit to energize the variable speed drive unit at a slow speed and to operate a first filament in said bulb to provide a dim slow moving brake light signal;
    said electronic circuit being responsive to said motion detector unit to energize the variable speed drive unit at a second, fast speed while energizing a second filament in said bulb, with said first filament remaining on, to provide a second bright, fast moving flashing brake light signal to indicate a rapid or an emergency deceleration of the vehicle when the brakes are applied;
    said electronic circuit being powered by the vehicle's battery;
    said device including a case with a wrap around lens and a curved reflector to increase the visibility of the brake light to the sides and rear of the vehicle.

2. A vehicle with an improved rear-mounted signal device consisting of a backup warning light including a double filament light bulb attached to a moving rod;
    a variable speed drive unit connected to the moving rod for moving the brake light at various speeds;
    a motion detector unit to detect reverse motion of the vehicle;
    an electronic circuit with a relay, which is responsive to the vehicle brake light circuit to energize the variable speed drive unit at a slow speed and to operate a first filament in said bulb to provide a dim slow moving backup warning light signal when no vehicle movement occurs;
    said electronic circuit being responsive to said motion detector unit to energize the variable speed drive unit at a second, fast speed while energizing a second filament in said bulb, with said first filament remaining on, to provide a second bright, fast moving flashing backup warning light signal to indicate reverse motion of the vehicle;
    said electronic circuit being powered by the vehicle's battery;
    said device including a case with a wrap around lens and a curved reflector to increase the visibility of the backup warning light to the sides and rear of the vehicle.

3. A vehicle with an improved rear-mounted signal device consisting of an emergency warning light including a double filament light bulb attached to a moving rod;
    a variable speed drive unit connected to the moving rod for moving the brake light at various speeds;
    a manual control switch with high and low operational settings;
    an electronic circuit with a relay, which is responsive to the low setting of the manual control switch to energize the variable speed drive unit at a slow speed and to operate a first filament in said bulb to provide a dim slow moving emergency warning light signal;
    said electronic circuit being responsive to the high setting of the manual control switch to energize the variable speed drive unit at a second, fast speed while energizing a second filament in said bulb, with said first filament remaining on, to provide a second bright, fast moving flashing emergency warning signal;
    said electronic circuit being powered by the vehicle's battery;
    said device including a case with a wrap around lens and a curved reflector to increase the visibility of the warning light to the sides and rear of the vehicle.

* * * * *